United States Patent [19]

Marie et al.

[11] Patent Number: 4,723,282
[45] Date of Patent: Feb. 2, 1988

[54] METHOD AND APPARATUS OF DECODING AND DECIPHERING A ROTATED VIDEO SIGNAL

[75] Inventors: Gérard J. M. Marie, Santeny-Villercresnes; Jean-Pierre C. Arragon, Roissy-en-Brie, both of France

[73] Assignee: U.S. Philips Corporation, New York, N.Y.

[21] Appl. No.: 810,443

[22] Filed: Dec. 17, 1985

[30] Foreign Application Priority Data

Jan. 8, 1985 [FR] France ................. 85 00179
Nov. 19, 1985 [FR] France ................. 85 17072

[51] Int. Cl.$^4$ ............................................. H04N 7/167
[52] U.S. Cl. ......................................... 380/14; 380/10
[58] Field of Search ............... 358/114, 119, 121; 179/2 DP, 1.5 R, 1.5 S; 380/14, 11, 19, 10

[56] References Cited

U.S. PATENT DOCUMENTS 4,392,021  7/1983  Slate ......................... 179/1.5 R
4,633,310  12/1986  Gautier ...................... 380/14

FOREIGN PATENT DOCUMENTS 0103339  3/1984  European Pat. Off. ............ 358/114
2431809  3/1980  France ........................ 358/114
8404013  10/1984  PCT Int'l Appl. .

Primary Examiner—Stephen C. Buczinski
Assistant Examiner—Linda J. Wallace
Attorney, Agent, or Firm—Thomas A. Briody; William J. Streeter; Gregory P. Gadson

[57] ABSTRACT

An arrangement for decoding and deciphering signals having been subjected to an encoding of the MAC type and to an enciphering by cyclic permutation at one point of cut, i.e. by cyclic permutation of the assembly of the chrominance and luminance signals C and Y, respectively, from an abscissa a situated in the chrominance signal, by using a sampling frequency $f_o$, or at two points of cut, i.e. by cyclic permutation independent of the chrominance and luminance signals C and Y, respectively, from abscissa $a_c$ and $a_y$, respectively, by using a sampling frequency $f_o$, especially characterized in that upon reception a sampling frequency $f_r$ is used different from $f_o$ and connected with the latter by the relation $$f_r = \frac{q}{p} f_o,$$

p and q being integers, and in that the new address (es) of the point(s) of cut is (are) chosen equal in the first case to the integral value closest to the result a' of the operation, $$a' E \frac{p}{q} a$$

and in the second case to the integral values closest to the results $a'_c$ and $a'_y$ of the operations $$a'_c = \frac{p}{q} a_c$$

and $$a'_y = \frac{p}{q} a_y.$$

Application: Television receiver according to the MAC standard.

10 Claims, 4 Drawing Figures

METHOD AND APPARATUS OF DECODING AND DECIPHERING A ROTATED VIDEO SIGNAL

BACKGROUND OF THE INVENTION

The present invention relates to a method of and an arrangement for decoding and deciphering signals having been subjected on the one hand to an encoding of the MAC type and on the other hand to an enciphering by cyclic permutation around one or two points of cut.

The encoding of video signals according to the MAC (Multiplexed Analog Components) standard consists in ensuring for each of the lines of the picture the successive transmission of the analog chrominance and luminance components. The enciphering by cyclic permutation consists in cutting at the emission the picture signal at an arbitrary point and in permuting the two useful line fragments thus formed, the inverse cyclic permutation of course being effected upon reception in order to recover a clear representation of the picture signal thus scrambled. This enciphering occurs at a point of cut when one of the two chrominance or luminance components is subdivided into two signals or at two points of cut when each of the two components is subjected to the said cyclic permutation around a point of cut associated with it.

The problem which arises is that of sampling the different frequencies upon the emission and upon the reception of signals of the MAC type having been subjected to an enciphering upon emission. This problem can in fact be met if, for example, television signals should be emitted encoded according to a MAC standard with a picture format larger than the format 4/3 and/or with a resolution higher than that of the preceding emissions and these emissions should be received in a compatible manner by receivers of the first generation which are adapted to a picture format more strongly reduced (4/3) and/or to a lower resolution.

In order to give practical examples, the case can be imagined in which the emissions of the first generation correspond to the MAC standard defined in the publication SPB 284, 3$^{rd}$ revised version (December 1984) of the UER (Union Européenne de Radiodifussion). Before the MAC encoding and enciphering, the signals are sampled at a rate of about 700 points for the luminance (sampling frequency 13.5 MHz) and of 350 points for the chrominance (sampling frequency 6.75 MHz). When these signals are encoded according to the MAC standard by utilizing a ratio r of the chrominance and luminance compression factors of $$r = \frac{C_c}{C_v} = 2,$$

the sampling frequency $f_o$ at the output of the encoding-/enciphering device is 20.25 MHz. The enciphering is obtained by cyclic permutation effected either on the luminance signal Y and the chrominance signal C separately or on the assembly of the signals Y and C, these signals being subjected to time shifts of a multiple of a base interval $\tau_o = 1/f_o \sim 49$ ns.

In order to increase the luminance resolution, it can be imagined to choose in the future a ratio r of the compression factors equal to 4 instead of 2. This is already possible when the signals are transmitted in amplitude modulation, for example, through cabled networks. This will also be possible in future for satellite transmissions in frequency modulation when the sensitivity of the receivers will have been improved and they can recover with a suitable signal-to-noise ratio, signals that have been subjected to time compressions by a factor 5 instead of the usual factor 3. With this ratio $r=4$, if the sampling frequency and the base interval used for the enciphering remain unchanged, the luminance signal comprises about 840 intervals instead of 700. In order to effect the deciphering from the same base interval as upon emission, in the receiver a luminance memory of 840 samples would thus have to be available instead of 700, which is not provided for in the receivers of the first generation constructed with memories of only 700 samples so that this solution becomes incompatible with these receivers.

In order to ensure that it is sufficient to use luminance memories of 700 samples, it is then possible to reduce the sampling frequency upon reception to the value $f_r = 5/6 \ f_o = 16,875$ MHz. It is then necessary to modify the addresses of points of cut (given by a pseudo-random address generator) by calculating the new addresses $a' = 5/6 \ a$. Since upon emission, there are, for example, in the luminance signal 256 possible addresses separated by intervals equal to $2\tau_o$, the new address $a'$ corresponds two in three times to a non-integral value. In the case of the chrominance signal, for which the addresses are separated by an interval equal to $\tau_o$, five in six times the address $a'$ is not integral. Since only a discrete number of samples (700 for Y, 175 for C) is memorized, the real address used in the integral value of $a'$ closest to its theoretical value so that an error is made with respect to the temporary reference of each line which can reach half a sampling interval upon reception. A vertical line of the picture would consequently be recovered in fact as a slightly zigzag-shaped line, the peak-to-peak amplitude of this zigzag form attaining about the width of a sampling space, i.e. 1/700 of the picture width in the case of the chrominance and 1/175 in the case of the luminance.

When the frequency $f_r = 5/6 \ f_o$, the division by 6 gives six possibilities of phase for the frequency $f_r$. Consequently, there are six possible sampling signals: $f_{ro}, f_{r1}, \ldots f_{r5}$, which differ from each other by a phase distance equal to $\pi/3$. Upon passage from the signal $f_{ri}$ to the signal $F_{ri+1}$, an advancement of $\pi/3$ of the phase of the sampling frequency occurs, which results in an advancement by a value equal to $\tau_r/6$ of the sampling instants. During reading of the memory, this becomes manifest in the picture by a shift to the right of the corresponding line over a distance equal to $1/6 \times 1/700$ of the picture width.

SUMMARY OF THE INVENTION

A first object of the invention is to provide a method of decoding and deciphering signals of the MAC type enciphered by cyclic permutation, in which the error introduced by the change of the sampling frequency of the reception is corrected by utilizing this possibility of shifting the recovered lines.

The method according to the invention is therefore in the case of an enciphering at two points of cut characterized in that upon reception a sampling frequency $f_r$ is used which is different from $f_o$ and related to the latter by the relation $$f_r = \frac{q}{p} f_o,$$

p and q being integers, in that the new addresses of points of cut are chosen equal to the integral values closest to the results $a'_c$ and $a'_y$ of the operations $$a'_c = \frac{p}{q} a_c$$

and $$a'_y = \frac{p}{q} a_y,$$

and in that at the beginning of the writing operation of each component C or Y in the memory from the abscissae $a'_c$ or $a'_y$, the sampling frequency $f_r$ is subjected either to a phase advancement which, expressed in a sampling period $\tau_r = 1/f_r$, is equal to the fractional part $g_c$ or $g_y$ of the result $a'_c$ or $a'_y$ when $g_c$ or $g_y$ is less than $\frac{1}{2}$ or less than or equal to $\frac{1}{2}$, or to a phase delay equal to $1 - g_c$ or $1 - g_y$ when $g_c$ or $g_y$ is higher than or equal to $\frac{1}{2}$ or higher than $\frac{1}{2}$.

To this method corresponds a decoding and deciphering arrangement used for carrying it out, the said arrangement being essentially composed of input circuits, one of which is an analogue-to-digital converter which receives the scrambled MAC signals, of circuits for processing the luminance component, of circuits for processing the chrominance component and of deciphering control circuits, and being characterized in that the sampling frequency $f_r$ of the said converter is different from the corresponding sampling frequency $f_o$ used during the enciphering, but related to it by the relation $$f_r = \frac{q}{p} f_o$$

and in that it comprises means for adjusting the addresses of the points of cut to integral values closest to the values $a'_c$ and $a'_y$ and means for phase advancement or delay upon sampling according to the value of the fractional part $g_c$ or $g_y$ of the said values $a'_c$ and $a'_y$.

In the case of enciphering at a point of cut, this method is characterized in that upon reception a sampling frequency $f_r$ is used different from $f_o$ and connected therewith by the relation $$f_r = \frac{p}{q} f_o,$$

p and q being integers, in that the new address of the point of cut is taken equal to the integral value closest to the result $a'$ of the operation $$a' = \frac{p}{q} a,$$

and in that at the beginning of the writing operation of the component C in the memory from the abscissa $a'$, the sampling frequency $f_r$ is subjected either to a phase advancement which, expressed in a sampling period $\tau_r = 1/f_r$, is equal to the fractional part g of the result $a'$ when g is less than $\frac{1}{2}$ or less than or equal to $\frac{1}{2}$, or to a phase delay equal to $1 - g$ when g is higher than or equal to $\frac{1}{2}$ or higher than $\frac{1}{2}$.

To this method likewise corresponds a decoding and deciphering arrangement used for carrying it out, the said arrangement being essentially composed of input circuits, one of which is an analogue-to-digital converter which receives the scrambled MAC signals, of circuits for processing the luminance component, of circuits for processing the chrominance component and of deciphering control circuits, and being characterized in that the sampling frequency $f_r$ of the said converter is different from the corresponding sampling frequency $f_o$ used during enciphering, but related thereto by the relation $$f_r = \frac{q}{p} f_o,$$

and in that it comprises means for adjusting the address of the point of cut to an integral value closest to the value $a'$ and means for phase advancement or delay upon sampling according to the value of the fractional part g of the said value $a'$.

The methods and structures thus suggested are advantageous in that the possibility of shifting the recovered lines is effectively utilized by causing the choice of the phase of the frequency $f_r$ to be controlled by the value g of the fractional part of the result of the operation $a' = 5a/6$.

In fact, according as this value is equal to 0, 1/6, 2/6, ... 5/6, the frequency $f_{r0}, f_{r1}, ... f_{r5}$ is chosen that is to say that an advancement equal to 0, 1/6 $\tau_r$, ... 5/6 $\tau_r$ is introduced, which permits of causing the beginning and the end of each line to coincide on two vertical lines. This results in that the sampling instant of the first sample received is advanced to the repeated sample (overlap), which does not lead to discontinuity in the signal if the time references of the synchronization and of the video are taken into account. In order that a certain tolerance subsists with respect to this time reference, advancement and delay shifts are preferably spread by ensuring that the frequency $f_o$ is subjected either to a phase advancement which, expressed in a period $\tau_r$, is equal to g when g is less than (less than or equal to) $\frac{1}{2}$, or to a phase delay equal to $1 - g$ when g is higher than or equal to (higher than) $\frac{1}{2}$. The address of the point of cut to be taken into account is then the integral value immediately below $a'$ when g is less than (less than or equal to) $\frac{1}{2}$ and immediately above $a'$ when g is higher than or equal to (higher than) $\frac{1}{2}$.

However, the correction of the error is not complete when the length of the recovered line is not equal to the original length, which is the case when at the frequency $f_r$ there is not an integral number of sampling intervals between the first useful sample received and the repeated sample (overlap) following the last useful sample received.

This is obviated according to the invention by a fourth measure, the method then being additionally characterized in that in the case of enciphering at two points of cut, when the maximum chrominance or luminance memory address is reached, the operation of writing the samples is restarted at the beginning of the chrominance or luminance memory after having marked a response time corresponding to a few transition samples and after having caused the sampling frequency $f_r$ to be subjected to a phase delay which expressed in a sampling period $\tau_r = 1/f_r$, is equal to the fractional part $h_c$ or $h_y$ of the result $\delta'_c$ or $\delta'_y$ of the operation $$\delta'_c = \frac{p}{q} \delta_c$$

or $$\delta'_y = \frac{p}{q} \delta_y,$$

c being equal to the number of sampling intervals at the frequency $f_o$ which separate the first useful sample C transmitted from the repeated sample following the last useful sample C transmitted and $\delta_y$ being equal to the number of sampling intervals at the frequency $f_o$ which separate the first useful sample Y transmitted from the repeated sample following the last useful sample Y transmitted.

In the case of enciphering at one point of cut, this fourth measure is such that the method is characterized in that, besides the response times which correspond to a few transition samples and which are marked upon passage from the operation of writing in the chrominance memory to that of writing in the luminance memory and then from the operation of writing in the luminance memory again to that of writing in the chrominance memory, the sampling frequency $f_r$ is caused to be subjected after the first response time to a phase delay which, expressed in the period $\tau_r$, is equal to the fractional part $h_c$ of the result $\delta'_c$ of the operation $$\delta'_c = \frac{p}{q} \delta_c,$$

$\delta_c$ being equal to the number of sampling intervals at the frequency $f_o$ corresponding to the sum of the signal C and of the first transition and after the second response time to a phase delay equal to the fractional part $h_y$ of the result $\delta'_y$ of the operation $$\delta'_y = \frac{p}{q} \delta_y,$$

$\delta_y$ being equal to the number of sampling intervals at the frequency $f_o$ corresponding to the sum of the signal Y and of the second transition.

Another object of the invention is to provide for the transmission an encoding and enciphering arrangement for a transmitter of television signals according to the MAC standard adapted to cooperate with a receiver comprising one of the decoding and deciphering arrangements according to the present invention and comprising for this purpose circuits similar to those of one of these arrangements so that the speed of the processing circuits and the capacity of the required memories can be reduced.

BRIEF DESCRIPTION OF THE DRAWINGS

In order that the invention may be readily carried out, it will now be described more fully, by way of example, with reference to the accompanying drawing, in which.

DETAILED DESCRIPTION OF THE INVENTION

Figure 3:
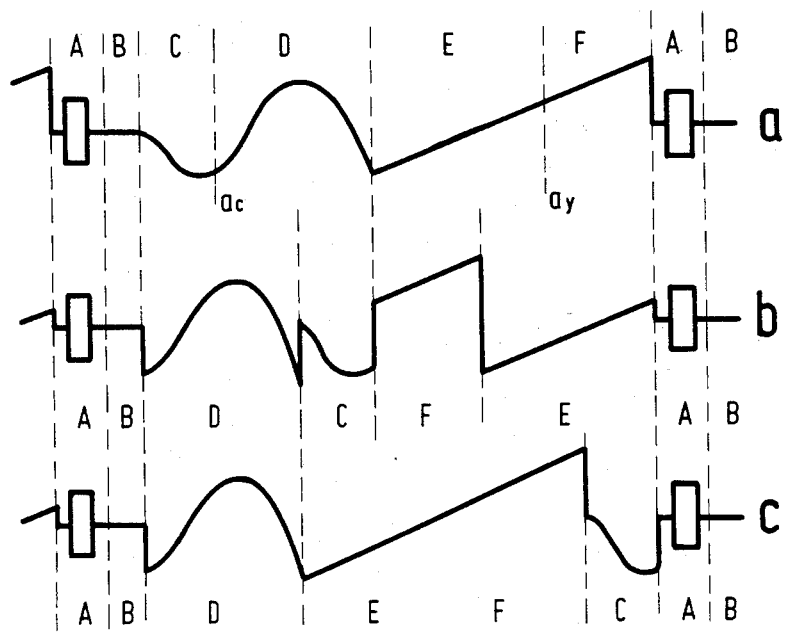
FIG. 3 shows in detail the principle of the methods of enciphering at one and two points of cut.

The method of enciphering at two points of cut consists in that upon transmission the two chrominance and luminance components on each scanning line are subdivided independently of one another each into two consecutive signals, the first of which is then delayed by the duration of the second and the second of which is advanced by the duration of the first. This method is illustrated in FIG. 3, where FIG. 3a shows the non-scrambled video signal of the MAC type for a scanning line and FIG. 3b shows the same signal, but now scrambled, with respect to the non-scrambled signal composed of the synchronization word A, of the reference period B, of the chrominance signal CD and of the luminance signal EF (the two last-mentioned signals being represented in arbitrary clearly distinct forms for a good understanding of the treatment carried out); the scrambled signal is consequently transmitted according to the sequence ABDCFE, which does not affect the reference period. The treatment upon reception then consists in that it is ensured that the sequences CD and EF are reestablished for the recovery in a clear representation of the chrominance and luminance components of the relevant scanning line.

In the case of the method of enciphering at one point of cut, only the chrominance component is subdivided. FIG. 3c shows how the scrambled signal is then transmitted according to the sequence ABDEFC, the first part C of the chrominance signal then being transmitted after the end of the transmission of the luminance signal EF which is not subjected at all to any cutting operation. As in the above case, the treatment upon reception consists in that it is ensured that the sequences CD and EF are re-established.

Figure 4:
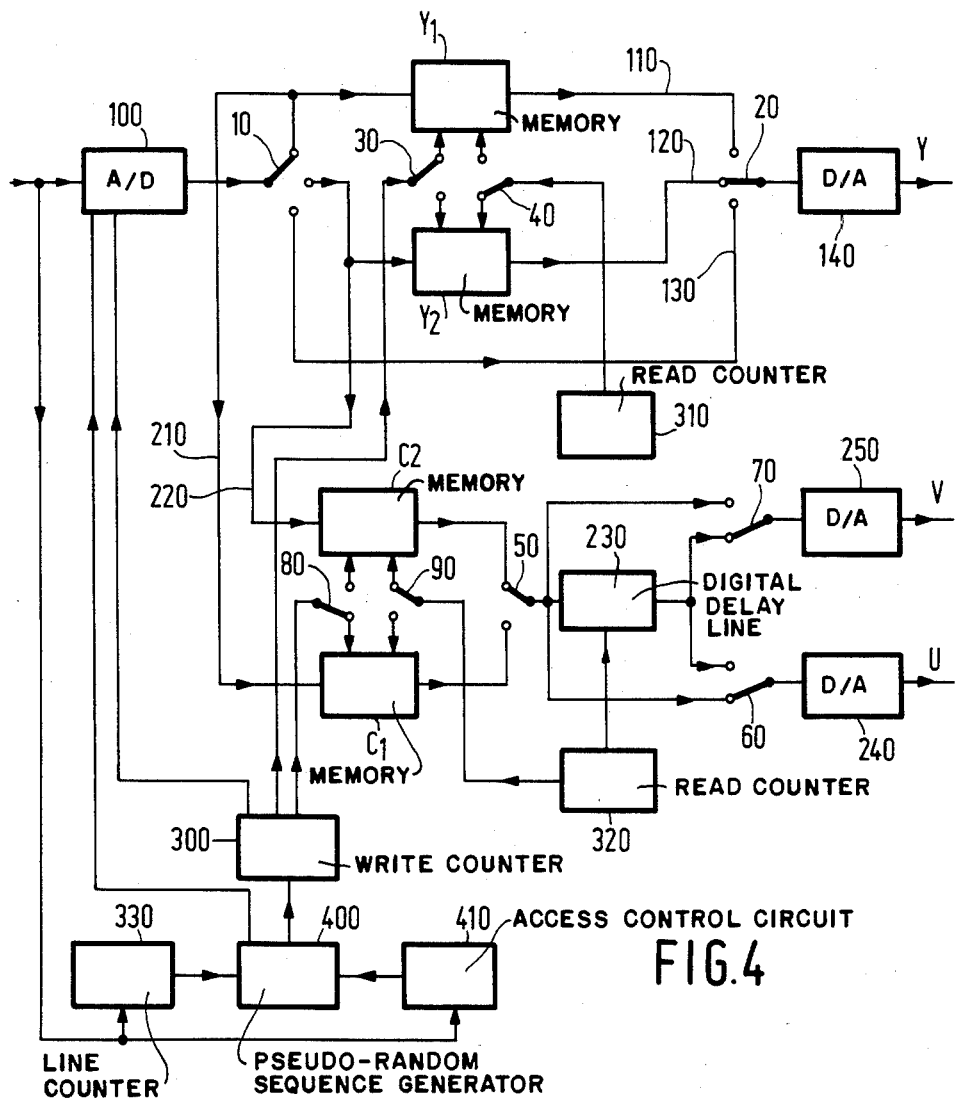
FIG. 4 shows by way of example a deciphering arrangement operating equally well with one point of cut as with two points of cut.

This recovery is possible by means of the deciphering arrangement shown in FIG. 4, which can operate equally well with one point of cut as with two points of cut and which comprises the essential elements of a conventional digital decoder of video signals of the MAC type with which are associated a modified write addressing counter of the memories, a digital pseudo-random sequence generator and for the control of the latter an access control circuit. More precisely, this deciphering arrangement is composed of the following elements:

1. input circuits:
  (a) an analog-to-digital converter 100 which receives the scrambled MAC signals;
  (b) a change-over switch having three outputs;
2. circuits for processing the luminance components:
  (c) an assembly of three parallel paths 110, 120, 130 connecting the three outputs of this change-over switch 10 to the three inputs of a change-over switch 20, the first and second paths 110 and 120 comprising a first and a second memory $Y_1$ and $Y_2$, respectively, for storing the luminance component addressed alternately by means of change-over switches 30 and 40 by a write counter 300 and a first read counter 310, while the third path 130 is a direct path;
  (d) a first digital-to-analog converter 140 which receives the output signal of the change-over switch 20 and supplies the luminance signal generally designated as Y;

3. circuits for processing the chrominance component:

(e) an assembly of two parallel paths 210 and 220 which are connected by means of a third and a fourth memory $C_1$ and $C_2$, respectively, for storing the chrominance component addressed alternately by means of change-over switches 80 and 90 by the write counter 300 and a second read counter 320 to the two respective inputs of a change-over switch 50, the output of this change-over switch being connected on the one hand to the input of a digital delay line 230 controlled by the read counter 320 (and realized, for example, in the form of a shift register) for delaying the chrominance component by the duration of a line and on the other hand to the first input of a change-over switch 60 and of a change-over switch 70, respectively, the other input of which receives the output signal of the said delay line;

(f) second and third digital-to-analog converters 240 and 250 which receive the output signals of the change-over switches 60 and 70, respectively, and supply the color difference signals generally designated at U and V;

4. deciphering control circuits:

(g) a counter 330 of the lines inside each frame;

(h) a digital pseudo-random sequence generator 400 synchronized by means of the line counter 330;

(i) an access control circuit 410 which supplies a starting word constituting the enciphering key to the pseudo-random sequence generator.

In the case of an enciphering with two points of cut, the operation of the deciphering arrangement thus composed is as follows. The pseudo-random sequence generator 400, which is synchronized by the counter 330 and which receives from the access control circuit 410 the key deciphered by it from the reception of the scrambled MAC signals, generates a digital pseudo-random word, of which the two abscissae $a_c$ and $a_y$ are derived from the points of division of the analog chrominance and luminance components obtained during scrambling upon transmission. Now, upon reception of the signals, the fraction D is written beginning at the address of the abscissa $a_c$ and then the fraction C is written beginning at the address 0; this writing operation is effected successively in the memory $C_1$ or in the memory $C_2$ according to the parity of the line by means of the write counter 300 controlled by the pseudo-random sequence generator 400 and addressing one or the other of the two memories as a function of the position of the change-over switch 80.

The operation of writing the chrominance component being accomplished, there is written likewise successively in the memory $Y_1$ or in the memory $Y_2$ according to the parity of the line and by means of the same write counter 300, which addresses one or the other of these two memories as a function of the position of the change-over switch 30, the fraction F beginning at the address of the abscissa $a_y$ and then the fraction E beginning at the address O.

Finally, in order to recover the luminance and chrominance signals, in increasing order of the addresses, the memories $Y_1$ and $C_1$ or $Y_2$ and $C_2$ are simultaneously interconnected by means of the counters 310 and 320. The reading frequencies of the luminance and chrominance memories are chosen so that the useful signals EF and CD are recovered in a time corresponding to the useful scanning time of the line, i.e. about 52 $\mu$sec., in the actual European standard 625 lines. The reading chrominance frequency is consequently less than the reading luminance frequency, which in turn is less than the writing frequency of the counter 300. The read counter 320 addresses the memories $C_1$ and $C_2$ alternately by means of the change-over switch 90 and the counter 310 addresses the memories $Y_1$ and $Y_2$ alternately by means of the change-over switch 40.

It is to be noted here that the nine change-over switches 10 to 90 are controlled by the counter 330, but these control connections are not shown in order not to affect adversely the clarity of FIG. 4.

The presence of the digital delay line 230 is not connected with the deciphering itself; this delay line is provided in order to permit the simultaneous recovery at the outputs of the digital-to-analog converters 240 and 250 of the color difference signals U and V, which are alternately transmitted. The control of this delay line 230 is ensured by the read counter 320 of the memories $C_1$ and $C_2$.

In the case of an enciphering with one point of cut situated in the chrominance signal, the pseudo-random generator generates a digital pseudo-random word, of which the abscissa a is derived from the fractional point of the analog chrominance component. Now, upon reception of the signals, the fraction of the signal arriving first in the chrominance memory $C_1$ or $C_2$ is written beginning at the address of the abscissa a. When the maximum address of the chrominance memory is reached, a response time corresponding to a transition period between chrominance and luminance signals is taken into account and then the rest of the signal is written into the luminance memory $Y_1$ or $Y_2$ beginning at the address 0 and ending at the highest address. When the maximum address of the luminance memory is reached, a second response time corresponding to the second transition period between luminance and chrominance signals is taken into account and then the memorization of the signal in the chrominance memory is continued beginning at the address 0. The simultaneous recovery of the luminance and chrominance signals is effected in the same manner as in the case of deciphering at two points of cut described above.

Figure 1:
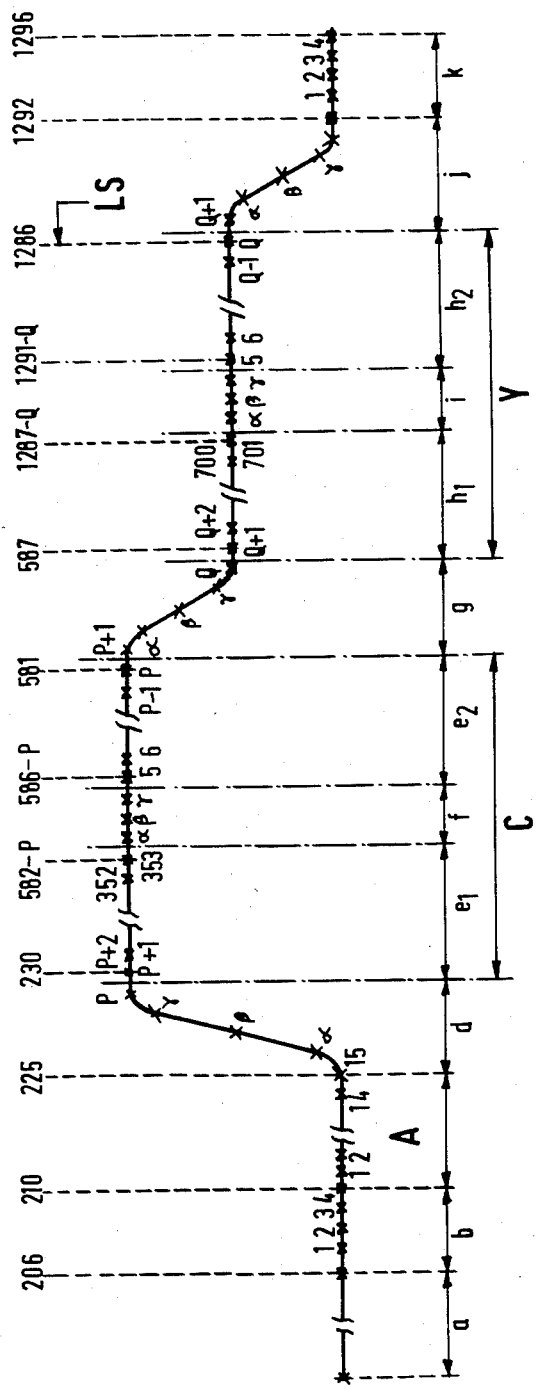
FIGS. 1 and 2 illustrate the encoding and enciphering propositions of the Union Européenne de Radiodifussion of December 1984 in the case of an enciphering at two points of cut and at one point of cut situated in the chrominance signal, respectively.

In FIG. 1, which shows the wave form of the modulation signal upon emission in the case of enciphering at two points of cut, A designates the alignment interval of the signal, C designated the duration of the chrominance signal, Y that of the luminance signal and LS designates the last sample to be memorized. The number of intervals at the sampling frequency $f_o = 20.25$ MHz that has to be taken into account is equal to:

(a) $\begin{cases} 352 \text{ intervals C, i.e. 349 useful samples and 3 transitions;} \\ 700 \text{ intervals Y, i.e. 697 useful samples and 3 transitions.} \end{cases}$ By choosing a ratio of the compression factors $r = C_c/C_y = 4$, there can be obtained either:

(b) $\begin{cases} 212 \text{ intervals C, i.e. 209 useful samples and 3 transitions;} \\ 840 \text{ intervals Y, i.e. 837 useful samples and 3 transition,} \end{cases}$ or (c) $\begin{cases} 213 \text{ intervals C, i.e. 210 useful samples and 3 transitions;} \\ 839 \text{ intervals Y, i.e. 836 useful samples and 3 transitions.} \end{cases}$ By choosing a sampling frequency upon reception $f_r = 5/6 \, f_o$, the number of intervals becomes $\delta' = 5/6$, i.e.:

| | |
|---|---|
| In the case (b) | 176⅔ intervals C<br>700 intervals Y; |
| in the case (c) | 177½ intervals C<br>699 1/6 intervals Y. |

In order that the last useful written sample situated just before the cut is geometrically spaced exactly by a sampling interval from the first useful written sample situated just after the cut, it is necessary that this last written sample is spaced in time exactly by a sampling interval $\tau_r$ from the repeated sample (overlap) which follows it and which coincides geometrically on the picture with the first received sample. Since all the useful samples have to be equidistant, the only means of recovering, as the case may be, a non-integral value of the overall sampling interval is to relate the non-integral part to the transition intervals, i.e.:

| | |
|---|---|
| in the case (b) | 176⅔ interval C = 174 useful interval + 2⅔ transitions;<br>700 intervals Y = 697 useful samples + 3 transitions; |
| in the case (c) | 177½ intervals C = 175 useful samples + 2½ transitions;<br>699 1/6 intervals Y = 697 useful samples + 2 1/6 transitions. |

This modification of the transition interval can be obtained in a very simple manner by changing the phase of the sampling frequency $f_r$ applied to the analog-to-digital converter 100 of FIG. 4 when arriving at the end of the memory and the following samples will be written at the beginning of the memory after having marked a response time of a few transition samples. In practice, this will result in that the following response times and the phase delays or advancements are obtained:

| | |
|---|---|
| in the case (b) | For C response during 3 samples and advancement of ½ $\tau_r$;<br>For Y response during 3 sample without delay or advancement; |
| in the case (c) | For C response during 3 samples and advancement of ½ $\tau_r$;<br>For Y response during 3 samples and delay of 1/6 $\tau_r$. |

It can be seen that in this case the number of transition intervals upon reception can be chosen equal to the number of transition samples upon transmission and that there can be introduced either a phase delay equal in a fraction of $\iota_r$ to the fractional part h of the result of the operation $\delta' = 5/6 \, \delta$ when h is less than ½, or an advancement equal to 1−h when h is higher than or equal to ½.

It is to noted that these phase jumps do not give rise to greater difficulties than those already met as a function of the abscissa of the point of cut because in the case of an enciphering at two points of cut it was already generally necessary to carry out a phase jump between the sampling of the chrominance signal and that of the luminance signal which each had been subjected to cyclic permutation from different addresses.

In the case in which the sampling frequency $f_r$ upon reception is different from that ($f_o$) upon transmission with $$f_r = \frac{p}{q} f_o,$$

the phase jumps of the sampling frequency $f_r$ applied to the analog-to-digital converter 100 of FIG. 4 are therefore controlled simultaneously by the addresses generated by the pseudo-random sequence generator 400 for the phase jumps applied at the instant of writing in the memory from the abscissa of cut and by the write counter 300 for the phase jumps applied at the writing instant at the beginning of the memory. Thus, FIG. 4 shows diagrammatically the connections extending from the generator 400 and from the counter 300 to the converter 100.

In order to determine the value of the phase of $f_r$ that has to be chosen at the instant of writing in the memory from the abscissa of cut, the pseudo-random sequence generator 400 has to be provided with a multiply-by-p and divide-by-q of the addresses $a_c$ and $a_y$ supplied by it. The integral value closest to the result of the operations is transmitted to the write counter 300 in order to control the abscissae at which the operation of writing in the memory $Y_1$ or $Y_2$ and in the memory $C_1$ or $C_2$ begins. The fractional values of the results of the operations are transmitted to the analogue-to-digital converter 100 in order to choose the phase of the sampling frequency $f_r$.

With regard to the phase jumps applied between the writing instants at the end and the beginning of the memory, because they are fixed values, they are written into read-only memories in the write counter 300 and their value is transmitted to the analog-to-digital converter 100 at the instant at which the write counter 300 arrives at the maximum write abscissa in the memory $C_1$ or $C_2$ and in the memory $Y_1$ or $Y_2$ so that at the instant at which the writing operation is restarted at the beginning of the memory, the sampling frequency $f_r$ applied to the converter 100 can be subjected to the desired phase jump.

Figure 2:
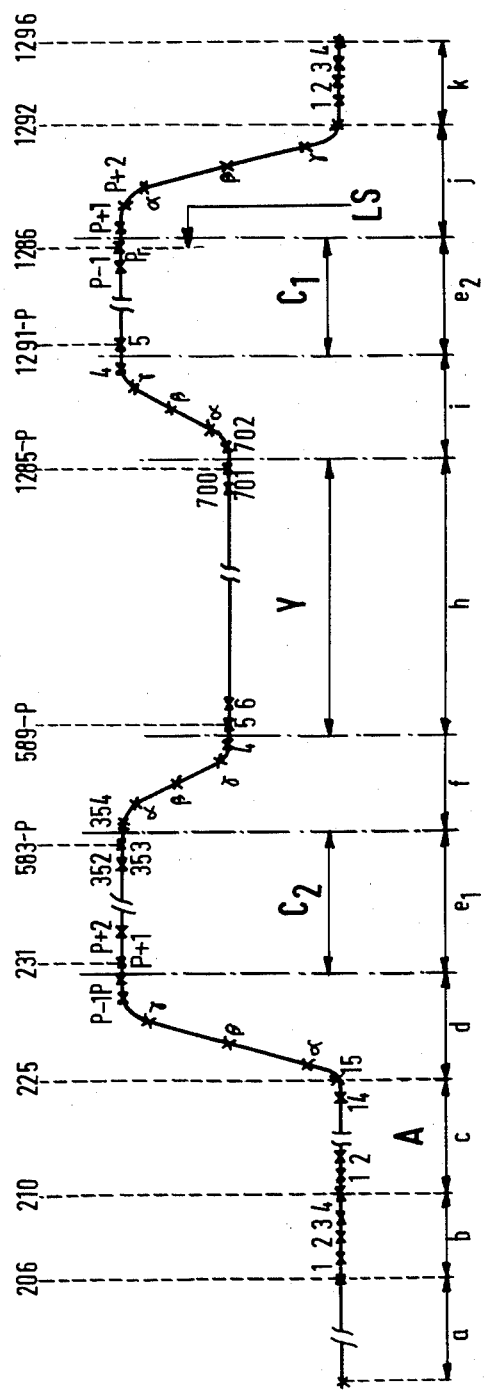

In the case of a signal having been subjected to an enciphering by cyclic permutation at one point of cut situated in the chrominance signal, the number of sampling intervals between the first useful sample C and the repeated sample following the last useful sample C comprises, as can be seen in FIG. 2 which illustrates (in the same manner as in the case of FIG. 1) the propositions of the Union Européenne de Radiodifussion of December 1984:

349 chrominance samples separated into 2 parts $C_1$ and $C_2$;

697 luminance samples;

2×5 transition samples $C_2$-Y and Y-$C_1$, which means 1056 intervals in all.

When a ratio of the compression factors $r = C_c/C_y = 4$ is chosen, for example, these intervals may be spread as follows:

215 intervals, i.e. 210 useful samples C and 5 transitions;

841 intervals, i.e. 836 useful samples Y and 5 transitions.

By choosing a sampling frequency upon reception of $$f_r = \frac{5}{6} f_o,$$

these numbers of intervals become 179 1/6 and 700 5/6, respectively, which can be spread for example, as follows:

175 samples C followed by 4 1/6 transitions:
696 samples Y followed by 4 5/6 transitions, in order that the positions of the first sample C in the memory and of the first sample Y in the memory after deciphering coincide on the picture with the positions of the first useful points C and Y sampled at the frequency $f_o$ in the encoder.

In order to ensure the correct relation between the different parts of the signal, it is therefore sufficient to provide, for example, 4 transition samples upon passage from $C_2$ to Y and from Y to $C_1$ and to provide moreover for a delay of 1/6 $\tau_r$ of the frequency $f_r$ at the end of the first transition and for a delay of 5/6 $\tau_r$ at the end of the second transition.

Since for the deciphering at two points of cut in the case in which the sampling frequency $f_r$ upon reception is different from that ($f_o$) upon transmission with $$f_r = \frac{p}{q} f_o,$$

the pseudo-random sequence generator 400 of FIG. 4 has to be provided with a multiply-by-p and divide-by-q circuit of the address a supplied by it for the deciphering at one point of cut. The integral value closest to the result of the operations is transmitted to the write counter 300 for controlling the abscissa at which the operation of writing in the memory $C_1$ or $C_2$ is started. The fractional value of the result of the operation is transmitted to the analog-to-digital converter 100 for choosing the phase of the sampling frequency $f_r$.

With regard to the phase jumps applied between the writing instants at the end of the chrominance memory and at the beginning of the luminance memory and between the writing instants at the end of the luminance memory and at the beginning of the chrominance memory, because they have fixed values, they are written into read-only memories in the write counter 300 and their values are transmitted to the analog-to-digital converter 100 at the instant at which the write counter 300 arrives at the maximum abscissa of writing in the memory $C_1$ or $C_2$ and then in the memory $Y_1$ or $Y_2$ so that at the instant at which the writing operation is restarted at the beginning of the following memory, the sampling frequency $f_r$ applied to the converter 100 can be subjected to the desired phase jump.

In order to simplify the realization of the system, it is possible to reduce the number of phases used in practice for $f_r$: for example only three phases may be used differing from each other by $2\pi/3$; the error introduced will be equal to ±1/12 $\tau_r$, which becomes manifest on the picture by a thickening of a vertical line equal to 1/6×1/700 of the picture luminance value, which is certainly not perceptible.

What is claimed is:

1. A method of decoding and deciphering upon reception, a multiplexed analog component video signal which has been, prior to transmission, independently rotated within both a chrominance and luminance component C and Y about pseudo-randomly generated abscissae $a_c$ and $a_y$ respectively, wherein said video signal has been sampled at sampling frequency $f_o$ prior to transmission, said method comprising the steps of:

deriving a reception sampling frequency $f_r$ at which said received video signal is to be sampled which is related to frequency $f_o$ by the relation $f_r=q/pf_o$, where p and q are integers and $f_r$ is less than frequency $f_o$;

deriving address locations in separate chrominance and luminance memories for new abscissae $b_c$ and $b_y$ which are the closest integral values to the results of the operations $a'_c=p/q\ a_c$ and $a'_y=p/q_y$ respectively, and defining $g_c$ and $g_y$ to be the fractional parts of $a'_c$ and $a'_y$ respectively; and rotating said video signal in an opposite sense to the rotation of said video signal prior to transmission and writing samples into their respective memories such that at the beginning of the chrominance component $f_r$ is advanced in phase by an amount equal to $g_c$ when $g_c \leq 0.5$ or delayed in phase by an amount equal to $1-g_c$ when $g_c > 0.5$, and at the beginning of the luminance component $f_r$ is advanced in phase by an amount equal to $g_y$ when $g_y \leq 0.5$, and delayed in phase by an amount equal to $1-g_y$ when $g_y > 0.5$.

2. A method as claimed in claim 1, characterized in that, when the maximum address in the chrominance or luminance memory is reached, the operation of writing the samples at the beginning of the chrominance or luminance memory is restarted after having marked a response time corresponding to a few transition samples, and after having caused the sampling frequency $f_r$ to be subjected to a phase delay which, expressed in a sampling period $\tau_r=1/f_r$, is equal to the fractional part $h_c$ or $h_y$ of the result $\delta'_c$ or $\delta'_y$ of the operation $$\delta'_c = \frac{p}{q} \delta_c$$

or $$\delta'_y = \frac{p}{q} \delta_y,$$

$\delta_c$ being equal to the number of sampling intervals at the frequency $f_o$ which separate the first useful sample C transmitted from the repeated sample which follows the last useful sample C transmitted and $\delta_y$ being equal to the number of sampling intervals at the frequency $f_o$ which separate the first useful sample Y transmitted from the repeated sample which follows the last useful sample Y transmitted.

3. A method as claimed in either of claims 1 or 2, characterized in that, p and q being incommensurable with each other and q being divisible by 2, by 3 or by 4, only q/2, q/3 or q/4 phase states of the sampling frequency $f_r$ are used, the advancements and delays being multiples of 2/q $\tau_r$, 3/q $\tau_r$ or 4/q $\tau_r$ and the chosen advancements or delays being closest to the values calculated from the fractional parts of the results of the operations $$a' = \frac{p}{q} a$$

and $$\delta' = \frac{p}{q} \delta.$$

4. A method as claimed in either of claims 1 or 2, characterized in that upon reception the number of transition samples at the frequency $f_r$ is equal to the number of transition samples at the frequency $f_o$ inserted upon transmission multiplied by the fraction p/q and rounded off to the integral lower value or to the integral higher value.

5. A decoding and deciphering arrangement for carrying out the method claimed in claim 1 the said arrangement being essentially composed of input circuits, one of which is an analogue-to-digital converter which receives the scrambled MAC signals, of circuits for processing the luminance component, of circuits for processing the chrominance component and of deciphering control circuits, and being characterized in that the sampling frequency $f_r$ of the said converter is different from the corresponding sampling frequency $f_o$ used the enciphering, but related to it by the relation $$f_r = \frac{q}{p} f_o,$$

and in that it comprises means for adjusting the addresses of the points of cut to integral values closest to the values $a'_c$ and $a'_y$ and means for phase advancement or delay upon sampling according to the value of the fractional part $g_c$ or $g_y$ of the said values $a'_c$ and $a'_y$.

6. A method of decoding and deciphering upon reception, a multiplexed analog component video signal which has been, prior to transmission, rotated within a chrominance component c about a pseudo-randomly generated abscissa a and containing a luminance component y, wherein said video signal has been sampled at sampling frequency $f_o$ prior to transmission, said method comprising the steps of:

deriving a reception sampling frequency $f_r$ at which said received video signal is to be sampled which is less than frequency $f_o$ and is related to frequency $f_o$ by the relation $f_r = q/p \, f_o$, where p and q are integers;

deriving an address location in a chrominance memory for a new abscissa b which is the closest integral value to the result of the operation $a' = p/q \, a$, and defining g to be the fractional part of $a'$; and rotating said video signal in an opposite sense to the rotation of said chrominance component prior to transmission and writing said chrominance component into said chrominance memory while writing a luminance component into a luminance memory such that at the beginning of said chrominance component $f_r$ is advanced in phase by an amount equal g when $g \leq 0.5$, and $f_r$ is delayed in phase by an amount equal to $1-g$ when $g > 0.5$.

7. A method as claimed in claim 6, characterized in that besides the response times which correspond to a few transition samples and which are marked upon passage from the operation of writing in the chrominance memory to that of writing in the luminance memory and then from the operation of writing in the luminance memory again to that of writing in the chrominance memory, the sampling frequency $f_r$ is caused to be subjected after the first response time to a phase delay which, expressed in a period $\tau_r$, is equal to the fractional part $h_c$ of the result $\delta'_c$ of the operation $$\delta'_c = \frac{p}{q} \delta_c,$$

$\delta_c$ being equal to the number of sampling intervals at the frequency $f_o$ corresponding to the sum of the signal C and of the first transition and after the second response time to a phase delay equal to the fractional part $h_y$ of the result $\delta'_y$ of the operation $$\delta'_y = \frac{p}{q} \delta_y,$$

$\delta_y$ being equal to the number of sampling intervals at the frequency $f_o$ corresponding to the sum of the signal Y and of the second transition.

8. A method as claimed in either of claims 6 or 7, characterized in that, p and q being incommensurable with each other and q being divisible by 2, by 3 or by 4, only q/2, q/3 or q/4 phase states of the sampling frequency $f_r$ are used, the considered advancements and delays being multiples of $2/q \, \tau_r$, $3/q \, \tau_r$ or $4/q \, \tau_r$ and the chosen advancements or delays being closest to the values calculated from the fractional parts of the results of the operations $$a' = \frac{p}{q} a$$

and $$\delta' = \frac{p}{q} \delta.$$

9. A method as claimed in either of claims 6 or 7, characterized in that upon reception the number of transition samples at the frequency $f_r$ is equal to the number of transition samples at the frequency $f_o$ inserted upon transmission multiplied by the fraction p/q and rounded off to the integral lower value or to the integral higher value.

10. A decoding and deciphering arrangement for carrying out the method claimed in claim 6 the said arrangement being essentially composed of input circuits, one of which is an analogue-to-digital converter which receives the scrambled MAC signals of circuits for processing the luminance component, of circuits for processing the chrominance component and of deciphering control circuits, and being characterized in that the sampling frequency $f_r$ of the said converter is different from the corresponding sampling frequency $f_o$ used during enciphering, but connected therewith by the relation $$f_r = \frac{q}{p} f_o,$$

and in that it comprises means for adjusting the address of the point of cut to an integral value closest to the value $a'$ and means for phase advancement or delay upon sampling according to the value of the fractional part g of the said value $a'$.

* * * * *